(12) United States Patent
Nagashima (10) Patent No.: US 6,167,973 B1
(45) Date of Patent: Jan. 2, 2001

(54) TRIMMING MACHINE HAVING BRAKING DEVICE FOR CUTTING BLADE

(75) Inventor: Akira Nagashima, Kawasaki (JP)

(73) Assignee: Kioritz Corporation, Tokyo (JP)

( * ) Notice: Under 35 U.S.C. 154(b), the term of this patent shall be extended for 0 days.

(21) Appl. No.: 09/231,779

(22) Filed: Jan. 15, 1999

(30) Foreign Application Priority Data

Jan. 16, 1998 (JP) .................................................. 10-006446

(51) Int. Cl.[7] .............................. B26B 15/00; A01D 69/10
(52) U.S. Cl. ...................... 173/221; 30/277.4; 30/DIG. 5; 56/11.3
(58) Field of Search ......................... 173/221; 83/DIG. 1; 30/277.4, DIG. 5; 56/11.3, 239

(56) References Cited

U.S. PATENT DOCUMENTS

| 3,793,727 | * | 2/1974 | Moore | 83/DIG. 1 X |
| 4,006,528 | * | 2/1977 | Katsuya | 30/276 |
| 4,226,312 | * | 10/1980 | Zindler | 56/11.3 X |
| 4,309,862 | * | 1/1982 | Carlson | 56/11.3 X |
| 4,753,012 | * | 6/1988 | Schurr | 83/DIG. 1 X |
| 5,146,735 | * | 9/1992 | McDonner | 56/11.3 |
| 5,791,057 | * | 8/1998 | Nakamura et al. | 83/DIG. 1 X |

FOREIGN PATENT DOCUMENTS 52-12089  5/1997  (JP) .

* cited by examiner

Primary Examiner—Rinaldi I. Rada
Assistant Examiner—Charles Goodman
(74) Attorney, Agent, or Firm—Jacobson, Price, Holman & Stern, PLLC (57) ABSTRACT

A trimming machine includes a centrifugal clutch for transmitting power from an internal combustion engine to a cutting blade. A manually operated throttle lever controls an output from the internal combustion engine by adjusting an opening of a throttle valve via a throttle wire. A friction member arranged to oppose to a clutch drum of the centrifugal clutch. A first swinging member is connected to the friction member and swings between a braking position to be pressed against the clutch drum and a releasing position to be spaced from the clutch drum. A second swinging member is connected to a connecting point at an intermediate portion of the throttle wire and pivots about a pivoting pin thereof with respect to the first swinging member when the throttle wire is moved by operating the throttle lever. The throttle wire extends along a bent path which is bent at the connecting point so that the pivoting pin of the second swinging member is moved toward the bent path by a swinging movement of the first swinging member so that the throttle wire has no play when the first swinging member is at the releasing position, and the pivoting pin of the second swinging member is moved away from the bent path by a swinging movement of the first swinging member so that the throttle wire has play when the first swinging member is in the braking position.

6 Claims, 12 Drawing Sheets

TRIMMING MACHINE HAVING BRAKING DEVICE FOR CUTTING BLADE

BACKGROUND OF THE INVENTION

The present invention relates to a trimming machine in which power from an internal combustion engine is transmitted via a centrifugal clutch, such as a portable grass trimmer, a hedge trimmer and a lawn mower, and more particularly, to a trimming machine provided with a braking device for preventing unexpected rotation of the cutting blade.

DESCRIPTION OF THE PRIOR ART

A trimming machine such as a shoulder-type portable grass trimmer, a backpack type portable grass trimmer, a hedge trimmer or the like, generally employs a driving mechanism which transmits power from an internal combustion engine via a centrifugal clutch to a cutting blade. In such a trimming machine, as disclosed in Japanese Patent Publication No. Sho 52-12089, a braking device is proposed which is provided with a friction member such as a brake shoe, a brake band or the like so as to make slidable contact with a clutch drum of the centrifugal clutch to prevent free rotation of a cutting blade for improved safety when starting the trimming machine. This braking device prevents the clutch drum from rotating and thereby prevents moving blade from unexpectedly rotating when an operator is not holding the brake lever. After having held the brake lever and released the braking device, the operator holds a throttle lever to adjust a throttle opening of a throttle valve to adjust the power from an internal combustion engine and drives the cutting blade via the clutch drum to carry out the trimming operation.

In this type of trimming machine, however, if the operator holds the throttle lever to cause the clutch drum to rotate before holding the brake lever to release the braking device, the clutch drum may be rotated by a rotating power which exceeds the braking force and as a result, the cutting blade may unexpectedly rotate. Further, if the clutch drum is rotated while a friction member pushes against the clutch drum, the braking device may be damaged or its useful life shortened due to a load exerted on the friction member by the rotated clutch drum.

Therefore, the object of the present invention is to provide a trimming machine in which driving power to the clutch drum will shut off when a braking device is operating.

SUMMARY OF THE INVENTION

The purpose of the present invention described above is accomplished by a trimming machine comprising: a cutting blade; an internal combustion engine for driving the cutting blade; a centrifugal clutch for transmitting power from the internal combustion engine to the cutting blade; a throttle valve; a throttle wire operatively connected to the throttle valve; a manually operated throttle lever for controlling an output from the internal combustion engine by adjusting an opening of the throttle valve via the throttle wire; a clutch drum provided in the centrifugal clutch; a friction member arranged to oppose the clutch drum; a first swinging member connected to the friction member and being allowed to swing between a braking position where the friction member is pressed against the clutch drum and a releasing position where the friction member is spaced from the clutch drum; a second swinging member connected to a connecting point at an intermediate portion of the throttle wire and being allowed to pivot about a pivoting pin with respect to the first swinging member when the throttle wire is moved by operating the throttle lever; and the throttle wire extending along a bent path which is bent at the connecting point so that the pivoting pin of the second swinging member is moved toward the bent path by a swinging movement of the first swinging member so that the throttle wire has no play when the first swinging member is at the releasing position and the pivoting pin of the second swinging member is moved away from the bent path by a swinging movement of the first swinging member so that the throttle wire has play when the first swinging member is at the braking position.

In the present invention, the throttle wire extends along the bent path which bends at a connecting point that is coupled with the second swinging member. When the first swinging member is at the releasing position, the pivoting shaft of the second swinging member is moved toward the bent path by a swing movement of the first swinging member. As a result, the throttle wire has no play. When the first swinging member is at the braking position, the pivoting shaft of the second swinging member is moved away from the bent path by the swing movement of the first swinging member to cause the throttle wire to have play. When the braking device is at the braking position, operational transmission from the throttle lever to the throttle valve via the wire and the throttle valve can not be opened even if an operator holds the throttle lever. Therefore, the clutch drum is not rotated. Accordingly, holding the braking device in braking condition enables the operator to avoid the case where the operator holds the throttle lever causes the clutch drum to overcome the braking force of the braking device whereby the cutting blade is unexpectedly driven. Thus greater safety is assured. Further, since the friction member and the clutch drum are not subjected to any overload to cause damage thereto, the life of the braking device can be extended.

DETAILED DESCRIPTION OF THE PREFERRED EMBODIMENTS

Referring to the attached drawings, preferred embodiments of the present invention shall be described herein after. A portable grass trimmer is described as an illustrative embodiment of a trimming machine.

Figure 1:
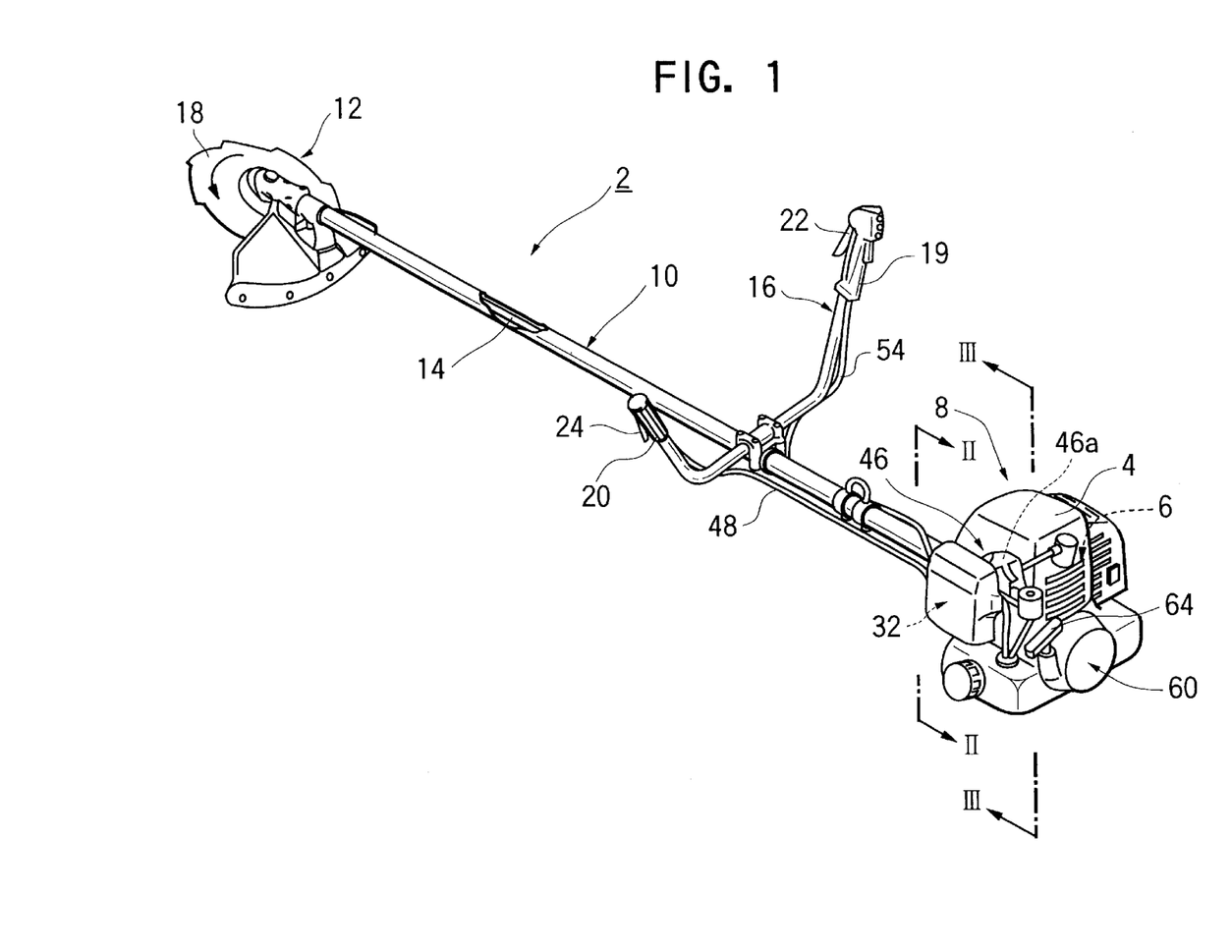
FIG. 1 is an overall perspective view of a portable grass trimmer of a first embodiment according to the present invention.

The basic construction of a portable grass trimmer 2 shown in FIG. 1 is well known and typically comprises a power section 8 having a two-stroke cycle air-cooled internal combustion engine 6 accommodated in a housing 4, a supporting tube 10 extending straight in a forward direction from the power section 8, and a rotary cutting device 12 mounted on the supporting tube 10 at a front end thereof. The power from a crankshaft 72 (see FIG. 2) of the internal combustion engine 6 is transmitted via a centrifugal clutch 32 and a transmission shaft 14 accommodated inside the supporting tube 10 as stated hereunder to the rotary cutting device 12 which rotatably drives a cutting blade or a cutter 18. A handle bar 16 is mounted on the supporting tube 10 at a middle portion thereof. It has a right grip portion 19 and a left grip portion 20 at right and left ends thereof, respectively. A throttle lever 22 for adjusting the throttle opening of a throttle valve 46a provided in a carburetor 46 of the internal combustion engine 6 is disposed adjacent to the right grip portion 19. As described later, the throttle lever 22 is connected to the throttle valve 46a via a throttle cable 54. A brake release lever 24 is disposed adjacent to the left grip portion 20 and is connected via a brake cable to a brake band 38, i.e., a friction member arranged around a clutch drum 34 of the centrifugal clutch 32 interposed between the internal combustion engine 6 and the transmission shaft 14.

Figure 2:
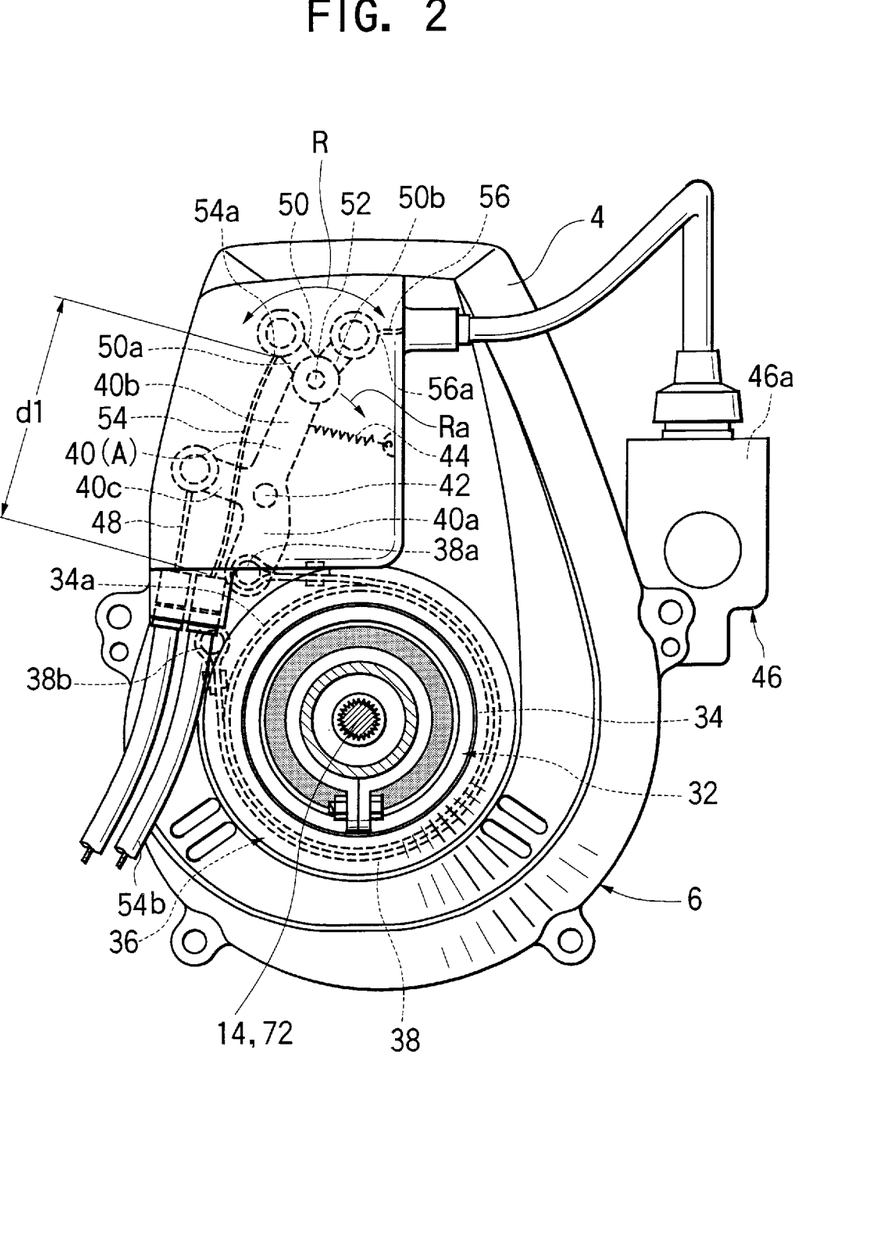
FIG. 2 is a sectional view taken along a line II—II of FIG. 1 where a first swinging rod member is at its initial position (a braking position) and a brake band is tightened against a clutch drum.

As shown in FIG. 2, the portable trimmer 2 of the present invention has the centrifugal clutch 32 operatively connected to the crankshaft 72 of the internal combustion engine 6. The clutch drum 34 of the centrifugal clutch 32 does not freely rotate when an operator is not trimming. This is accomplished by a braking device 36 that prevents idling rotation or free rotation of the cutter 18. The braking device 36 comprises a friction member or a brake band 38 arranged around the clutch drum 34 of the centrifugal clutch 32, and a first swinging rod member 40 for pulling the brake band 38 to press against a circumferential surface 34a of the clutch drum 34 or for loosening the brake band 38 to brake or release the braking device 36. The first swinging rod member 40 is attached to the housing 4 at a first pivoting pin 42 disposed at a middle portion thereof so as to swing to the right or left direction thereabout. The lower end of a lower arm portion 40a of the first swinging rod member 40 is connected to the brake band 38 at one end 38a. The first swinging rod member 40 swings to the right or left direction about the first pivoting shaft 42 between a braking position "A" where the brake band 38 is pressed against the circumferential surface 34a of the clutch drum 34 and a release position "B" where the brake band 38 is spaced from the circumferential surface 34a of the clutch drum 34. The brake band 38 is a strip made of spring steel material and bent around the clutch drum 34. The brake band 38 is fixed to the housing 4 at the other end 38b. The first swinging rod member 40 is biased toward the braking position "A" by a first tension spring 44 which pulls an arm portion 40b that is above the first pivoting pin 42 as shown in FIG. 2 to constantly press the brake band 38 against the clutch drum 34.

The carburetor 46 is mounted on an outer surface of the housing 4 on its left side with respect to the supporting tube 10 as viewed in FIG. 1. The throttle valve 46a is provided within the carburetor 46. Referring again to FIG. 2, a lateral arm portion 40c extending laterally from the vicinity of the first pivoting pin 42 and away from the carburetor 46 is integrally formed with the first swinging rod member 40. A front end of the lateral arm portion 40c is connected to the brake cable 48 which is connected to the brake release lever 24 substantially without play.

Further, at the upper end of the first swinging rod member 40, a second V-shaped swinging member 50 protruding upwardly is pivotably mounted on the upper end of the upper arm portion 40b of the first swinging rod member 40 so as to swing right and left about a second pivoting pin 52. Out of two swing arms of the second V-shaped swinging member 50, one arm which is located further from the carburetor 46 than the other arm (hereinafter called "a throttle lever side swing arm 50a") and is connected with the first throttle wire 54 which is connected to the throttle lever 22. The first throttle wire 54 extends from the throttle lever side swing arm 50a in a downward direction toward the throttle lever 22. Out of the two swing arms of the V-shaped swinging member 50, the other arm which is located closer to the carburetor 46 than the throttle lever side swing arm 50a (hereinafter called "a carburetor side swing arm 50b"), is connected with a second throttle wire 56 which is connected to the throttle valve 46a provided to the carburetor 46. The second throttle wire 56 extends laterally from the carburetor side swing arm 50b toward the throttle valve 46a of the carburetor 46. That is, the throttle wire including the first and the second throttle wires 54 and 56 extends along a bent path "R" which bends at coupling points 54a, 56a of the V-shaped swinging member 50.

When the first swinging rod member 40 is at the braking position "A" as shown in FIG. 2, the second pivoting pin 52 of the V-shaped swinging member 50 is located away from the bent path "R", and the first throttle wire 54 and the second throttle wire 56 each have play, respectively, as shown in FIG. 2. Accordingly, when the first swinging rod member 40 is at the braking position "A", the play prevents operational transmission via the throttle wires 54, 56 to the throttle valve 46a even if the throttle lever 22 is fully pulled by an operator. Therefore, neither the throttle valve 46a is opened nor is the clutch drum 34 rotated by the power from the internal combustion engine 6.

Figure 3:
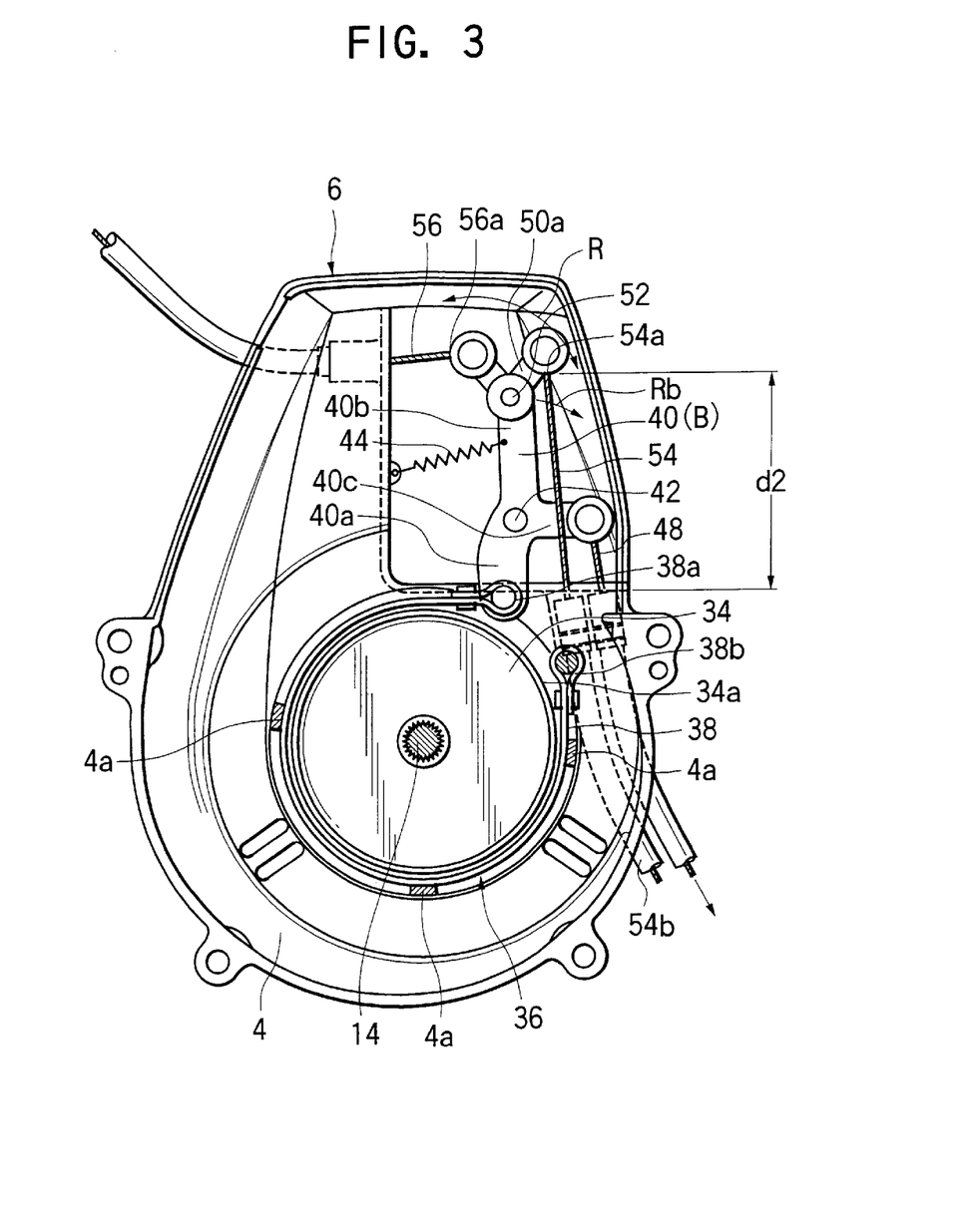
FIG. 3 is a sectional view taken along a line III—III of FIG. 1 where a brake release lever is held by an operator, the first swinging rod member is moved from the braking position to a releasing position and the brake band is released.

If the operator further continues to hold the brake release lever 24, the lateral arm portion 40c of the first swinging rod member 40 is pulled via the brake cable, whereby the first swinging rod member 40 is moved from the braking position "A" to the releasing position "B" against the biasing force of the first tension spring 44. It causes the brake band 38 to be loosened, as shown in FIG. 3. The spring steel brake band 38 moves away from the circumferential surface 34a of the clutch drum 34 due to its own elastic returning force and held to a position where the brake band 38 is in engagement with three projections 4a, 4a, 4a formed on the housing 4 as brake band stoppers.

The first throttle wire 54 is housed in a tube 54b so as to allow relative movement therein. Regarding the distance from the upper end of the tube 54b to the throttle lever side swing arm 50a of the second V-shaped swinging member 50, the distance d2 when the first swinging rod member 40 is at the releasing position "B" as shown in FIG. 3 is longer than the distance d1 when the first swinging rod member 40 as shown in FIG. 2 is at the braking position "A". That is, when the first swinging rod member 40 moves from the braking position "A" to the releasing position "B", the second pivoting pin 52 of the second V-shaped swinging member 50 located at the upper end of the first swinging rod member 40 is moved toward the path "R" where the throttle wires 54, 56 extend as specified by an arrow "Rb", where the first throttle wire 54 and the second throttle wire 56 no longer have play. As shown in FIG. 3, the second V-shaped swinging member 50 is pulled by the first throttle wire 54 and the second throttle wire 56 to a position where the first throttle wire 54 and the second throttle wire 56 are pulled in opposite directions from each other until there is no play in the wire system and they balance relative to each other. This enables operational transmission between the throttle lever 22 and the throttle valve 46a.

When the throttle lever 22 is held by the operator in addition to the increasing stroke of the pulled throttle lever 22 while the brake release lever 24 is held as stated above, the first throttle wire 54 and the second throttle wire 56 are pulled by an increase in the stroke of the throttle lever 22 to cause the throttle valve 46a to open. The travel of the first throttle wire 54 and the second throttle wire 56 causes only the second V-shaped swinging member 50 to swing about the second pivoting pin 52 with respect to the first swinging rod member 40. On the other hand, the first swinging rod member 40 is held at the releasing position "B" and does not swing.

FIGS. 5 to 12 show a second embodiment of a portable grass trimmer of the present invention. Compared to the portable grass trimmer 2 in FIG. 1, a portable grass trimmer 2' in FIG. 5 has a similar construction except that it does not have the brake release lever 24 provided adjacent to the left grip portion 20 of the portable grass trimmer 2 in FIG. 1. Therefore, similar portions are indicated by the same reference numerals.

Figure 6:
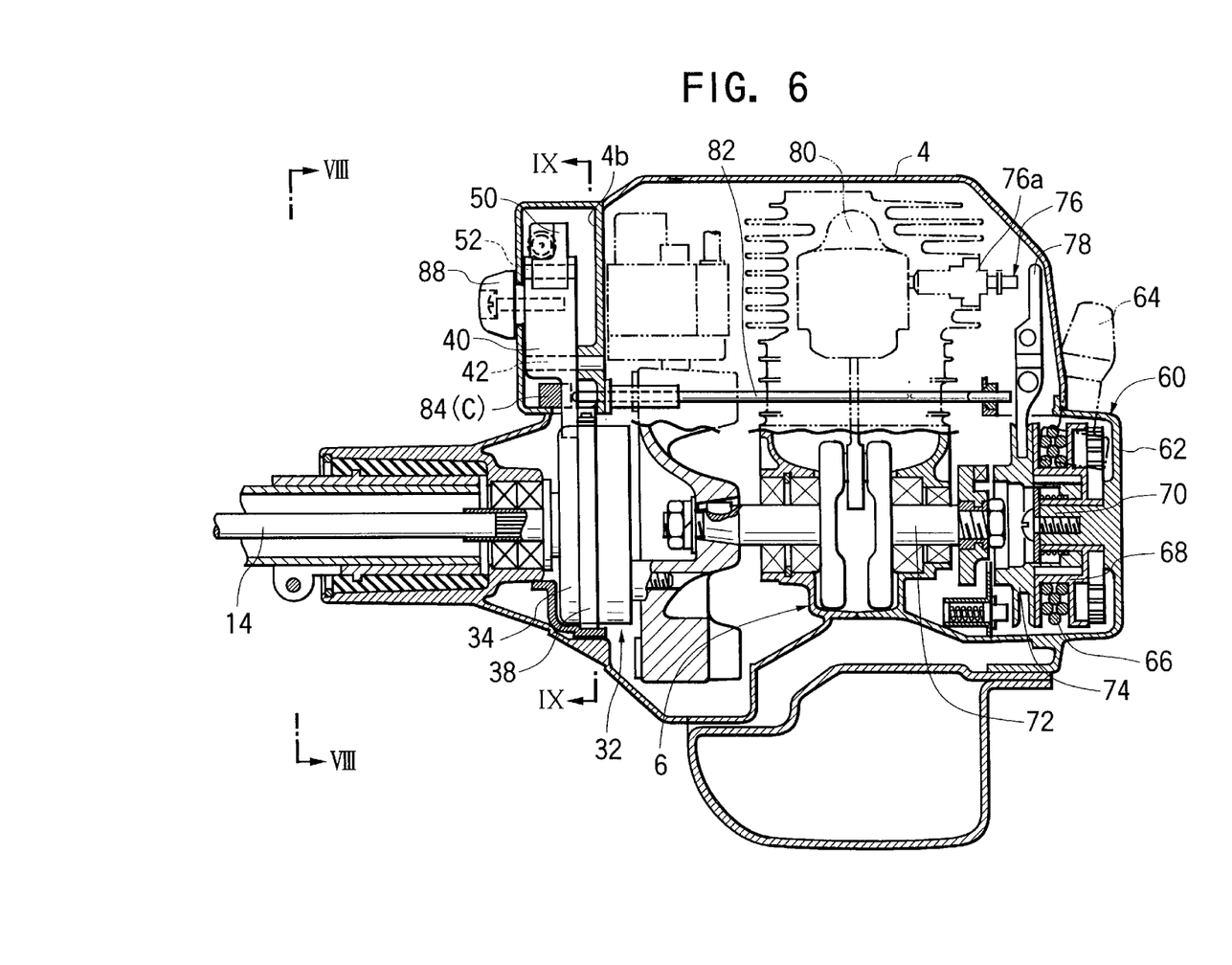
FIG. 6 is a sectional view taken along a line VI—VI of FIG. 5.

A recoil starter 60 for starting the internal combustion engine 6 is provided at a rear portion of the housing 4. The construction of the recoil starter 60 is well known and is disclosed, for example, in Japanese Utility Model Laid-open Publication No. Hei 5-92470, incorporated by reference herein. Accordingly, the construction of the recoil starter 60 shall be briefly described herein without a detailed description. With reference to FIG. 6, the recoil starter 60 comprises a starter cover 62, a recoil drum 68 rotated by a recoil rope 66 having a handle 64 to be quickly pulled at its end, and a rotary transmission member 74 which is rotatably supported by a bearing portion 70 mounted on the starter cover 62 and moves forward in an axial direction in the manner as a Bendix gear type to transmit the torque from the recoil drum 68 to the crankshaft 72 when the recoil drum 68 is rotated.

The portable grass trimmer 2' according to the present embodiment is provided with a decompression device 76 of the internal combustion engine 6. The decompression device 76 is similarly constituted as the one disclosed, for example, in Japanese Utility Model Laid-open Publication No. Hei 5-92470, incorporated by reference herein. Since it is well known, a detailed description is not needed. The decompression device 76 is attached to the rotary transmission member 74 and has a pushing member 78 extending upwardly to a decompression valve 76a. When the rotary transmission member 74 moves forward in the axial direction of the crankshaft 72, the pushing member 78 moves forwardly together with the rotary transmission member 74 in the axial direction to push the decompression valve 76a to cause the valve 76a to open. This valve opening allows a mixture in a combustion chamber 80 of the internal combustion engine 6 move through a decompression passage (not illustrated) to a scavenging port and reduce the pressure acting on a piston head to allow an easy start of the internal combustion engine 6 without a need to apply a strong force to the recoil starter 60.

As described above, when the rotary transmission member 74 moves forward in the axial direction, the pushing member 78 attached to the rotary transmission member 74 also moves forward in the axial direction. An interlocking member or a shift rod 82 extends horizontally from the front vicinity of the pushing member 78 to a front wall 4b of the housing 4 so as to detour a cylinder portion of the internal combustion engine 6 and is provided inside the housing 4 as seen in the FIG. 7. In the vicinity of the front end of the shift rod 82, a holding member 84 is provided. The holding member 84 is pivotably attached to an outer surface of the front wall 4b of the housing 4 by a third pivoting pin 84a and is rotatable between a holding position (C) adjacent to the front wall 4b of the housing 4 and a retracted position (D) away from the front wall 4b of the housing 4 (see also FIG. 9). The holding member 84 is biased toward the holding position (C) by a second spring 86. The holding member 84 engages with the lower arm portion 40a of the first swinging rod member 40 (see FIG. 7) so as to hold the first swinging rod member 40 at the releasing position "B". The holding member 84 is moved from the holding position (C) to the retracted position (D) when the shift rod 82 is moved by the forward movement of the pushing member 78 caused by the forward movement of the rotary transmission member 74 in the axial direction.

Figure 4:
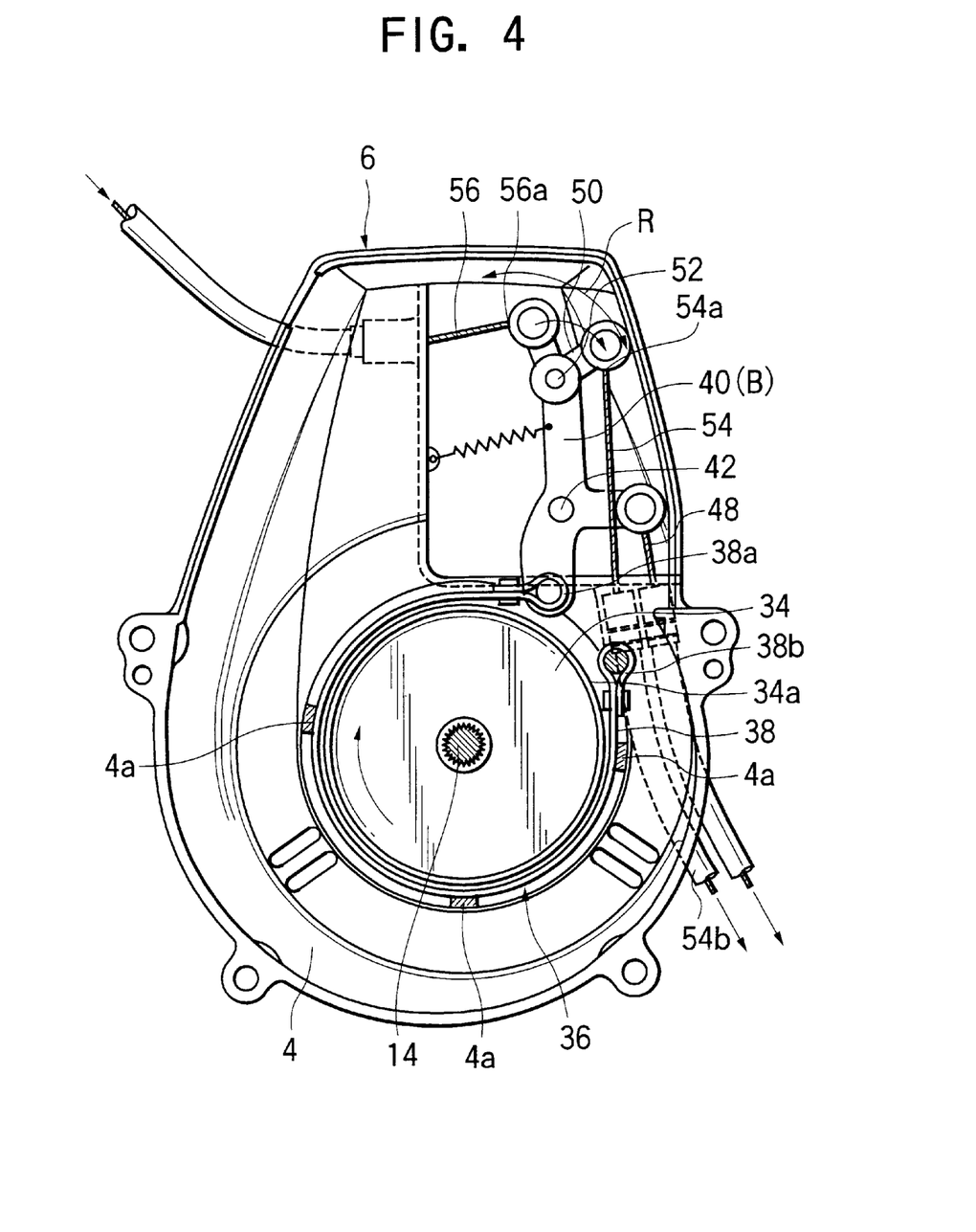
FIG. 4 is a view along a line III—III of FIG. 1 and shows where an operator holds a brake release lever to move the first swinging rod member from the braking position to the releasing position to release the brake band, and further holds a throttle lever to open a throttle valve.
Figure 5:
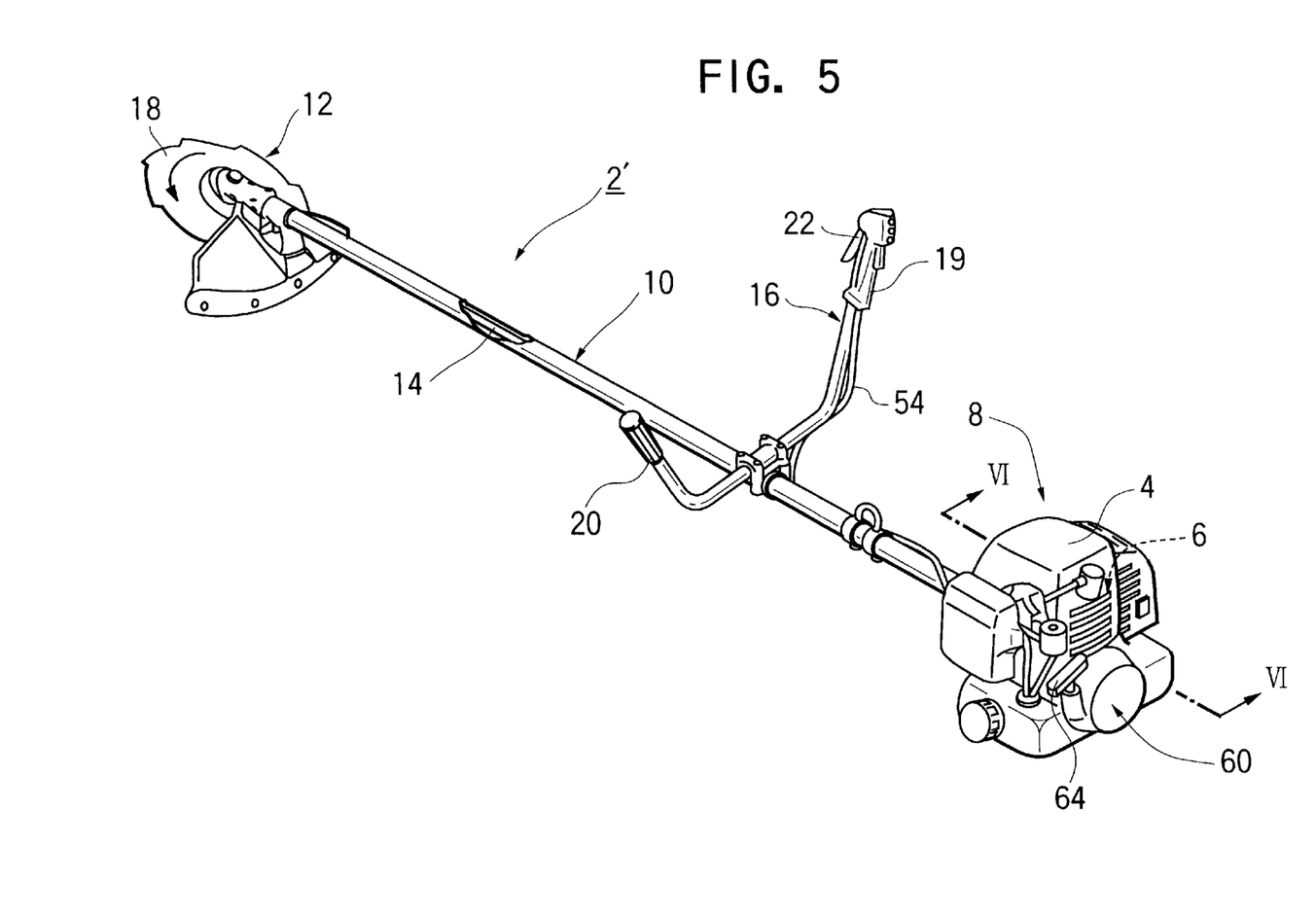
FIG. 5 is an overall perspective view of a portable grass trimmer of a second embodiment according to the present invention.
Figure 8:
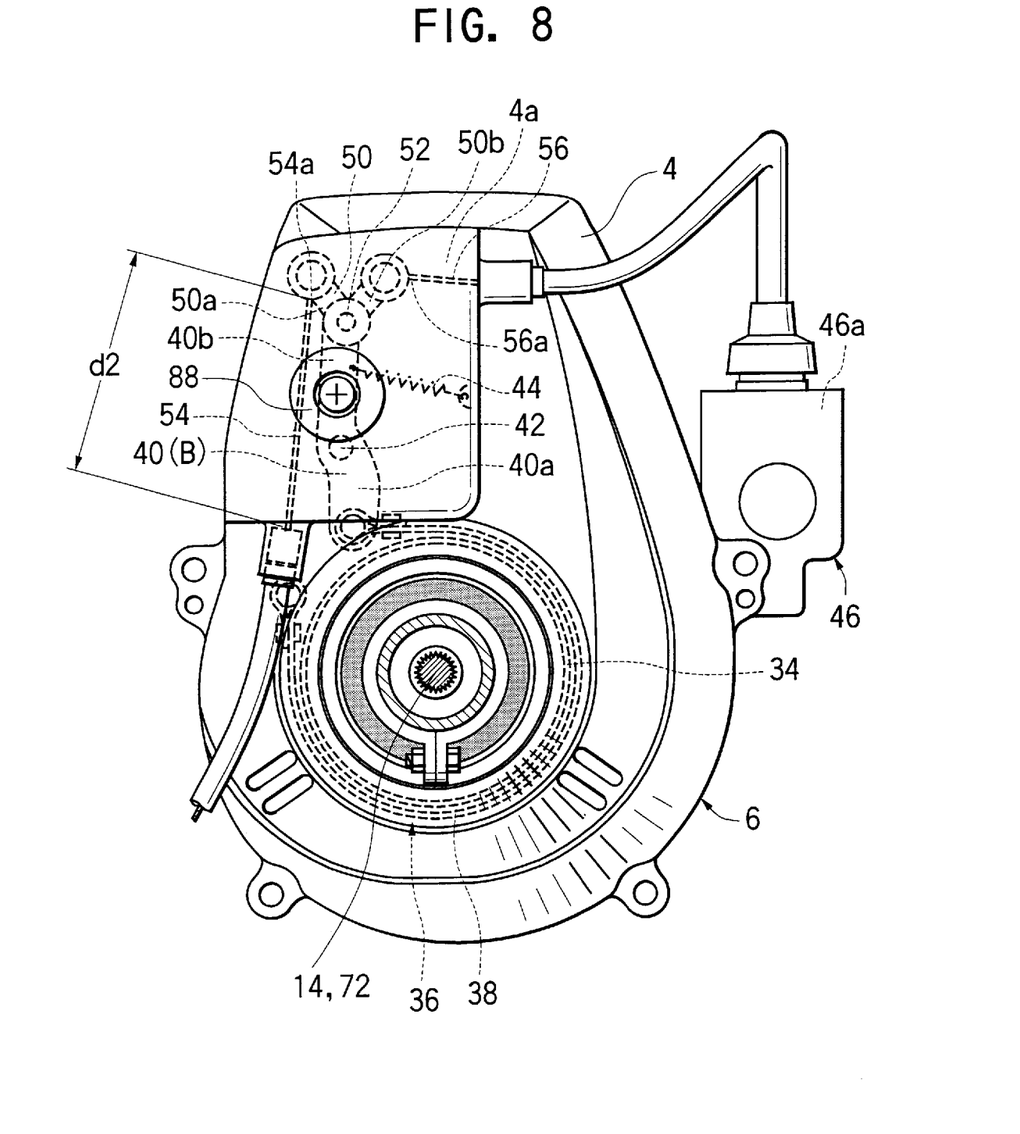
FIG. 8 is a sectional view taken along a line VIII—VIII of FIG. 6 and shows where the first swinging rod member is at its initial position (the releasing position) and the brake band is released.
Figure 9:
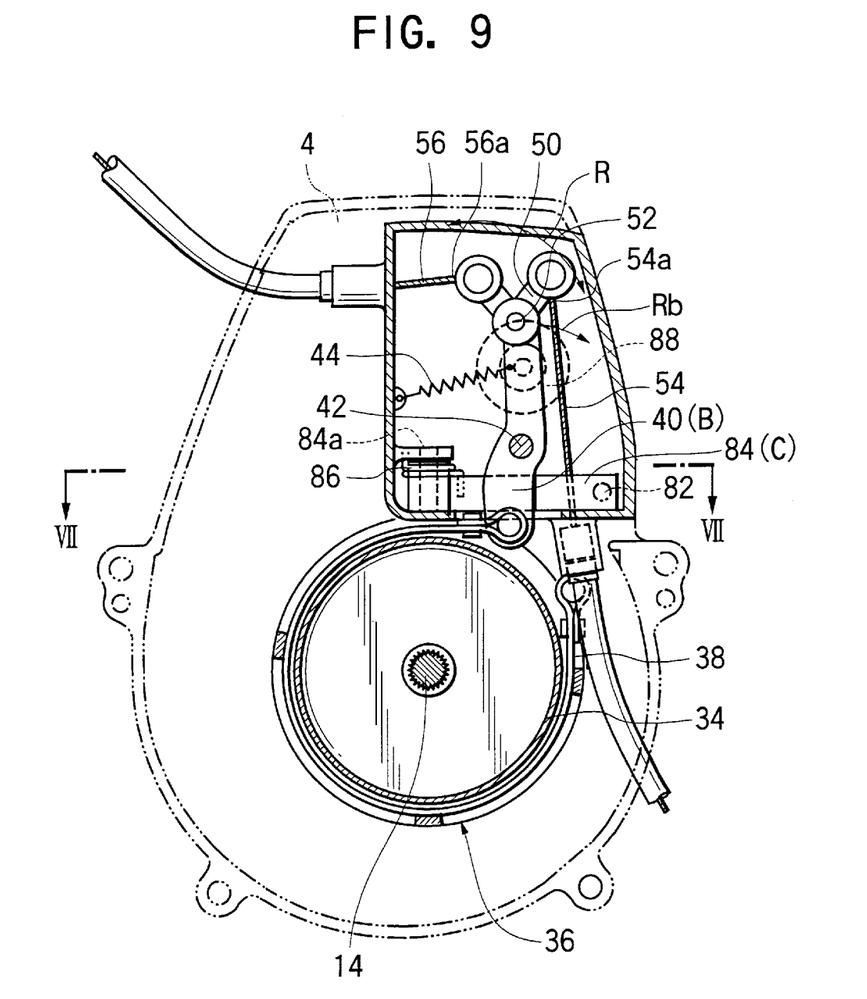
FIG. 9 is a sectional view taken along a line IX—IX of FIG. 6 similar to FIG. 8.

FIGS. 8 and 9 corresponds to FIG. 3 of the first embodiment which has been explained with reference to FIGS. 2, 3 and 4. The second embodiment is similarly constructed as the first embodiment, except that the brake release lever 24, the brake cable 48, and the lateral arm portion 40c of the first swinging rod member 40 are not provided, and that the first swinging rod member 40 is held at the releasing position "B" by the holding member 84 and further that the brake band 38 is kept away from the clutch drum 34 and is loosened. Therefore, similar portions are indicated by the same reference numerals.

Figure 7:
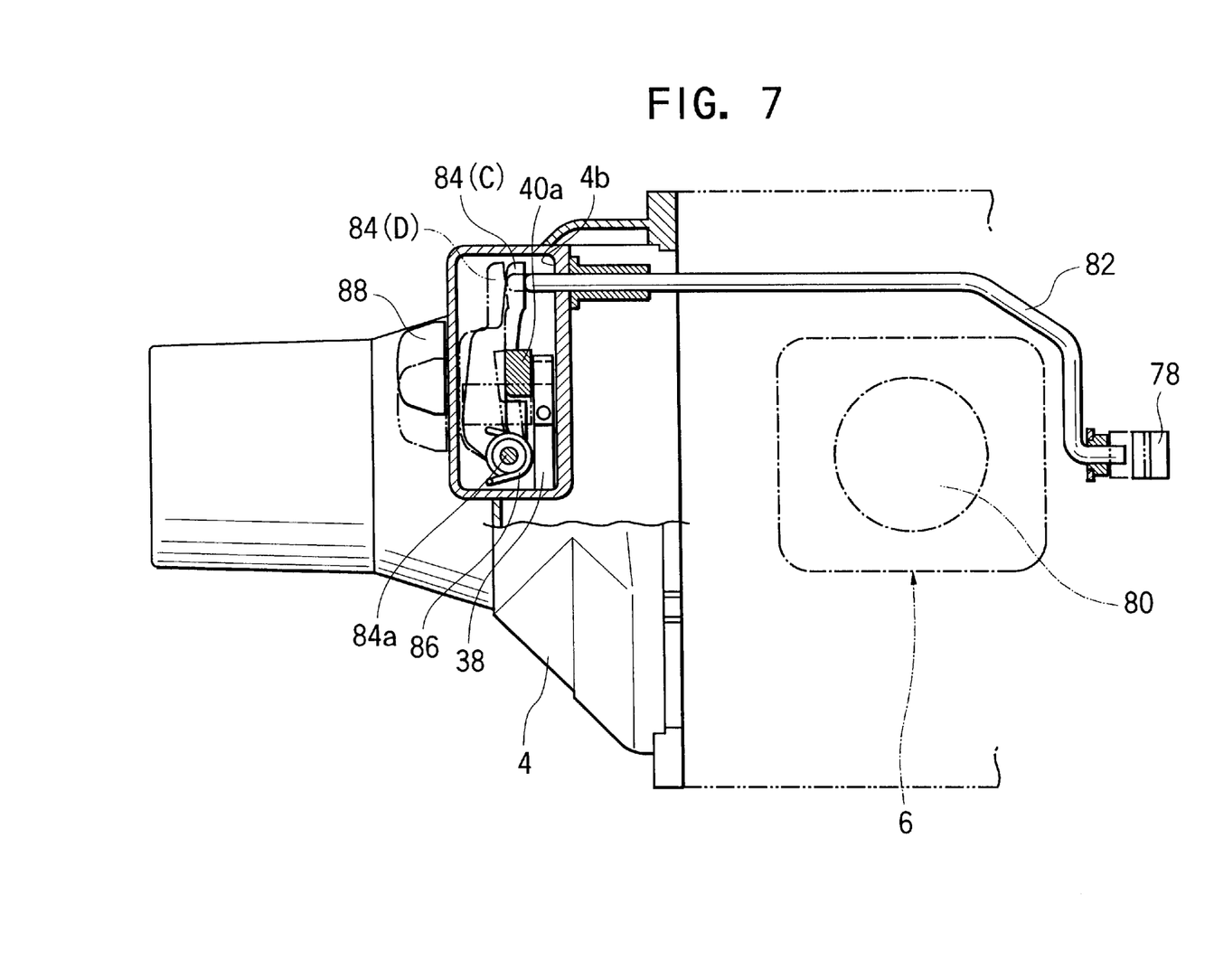
FIG. 7 is a sectional view taken along a line VII—VII of FIG. 9.

The first and the second throttle wires 54 and 56 extend along a bent path "R" via the coupling points 54a, 56a to the second V-shaped swinging member 50 as in the first embodiment. Further the first swinging rod member 40 is at the releasing position and the second pivoting pin 52 of the second V-shaped swinging member 50 located at the upper end of the first swinging rod member 40 is located at the position moved toward the path "R" along which the throttle wires 54, 56 extend in the direction indicated by an arrow "Rb". That is, the first throttle wire 54 and the second throttle wire 56 have no play as shown in FIGS. 8 and 9. Therefore, an operational transmission path is established between the throttle lever 22 and the throttle valve 46a. The first swinging rod member 40 is biased toward the braking position "A" by the first tension spring 44. When the holding member 84 mounted on the outer surface of the housing 4 is held at the holding position (C), the holding member 84 engages with the first swinging rod member 40 as shown in FIG. 7 against the biasing force of the first tension spring 44 and holds the first swinging rod member 40 at the releasing position "B". Further, a reset device 88 which is coupled to the upper arm portion 40b of the first swinging rod member 40 so as to permit lateral movement is mounted on the outer surface of the housing 4. The first swinging rod member 40 is moved from the releasing position "B" to the braking position "A" by the first tension spring 44 when the holding member 84 is moved to the retracted position (D) by the shift rod 82, which shall be explained in detail. The lateral movement of the reset device 88 by an operator allows the first swinging rod member 40 to be moved from the braking position "A" to the releasing position "B". When the first swinging rod member 40 moves to the releasing position "B", the holding member 84 is moved from the retracted position (D) to the holding position (C) by the biasing force of the second spring 86, and thus the first swinging rod member 40 is held at the releasing position "B".

Figure 10:
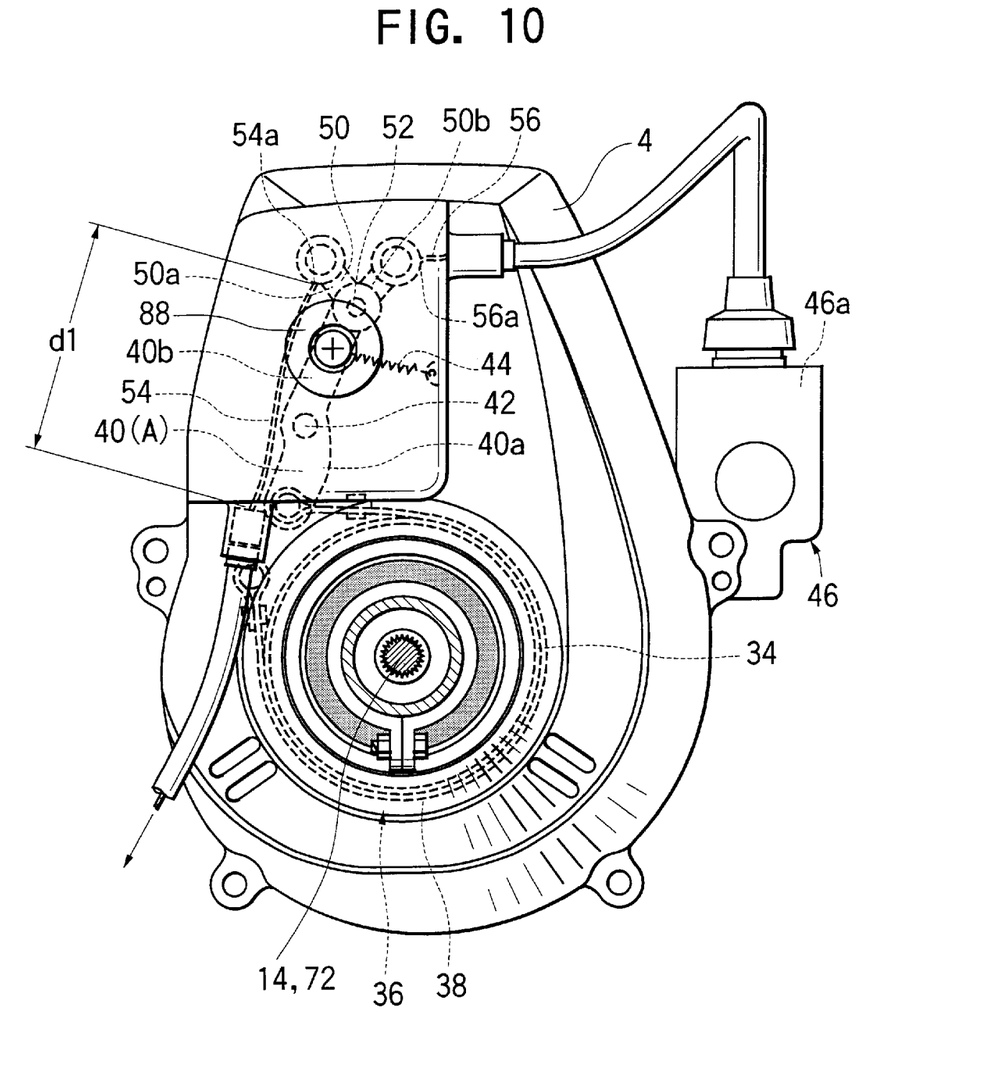
FIG. 10 is a view similar to FIG. 2 and shows a braking device and a throttle wire when a recoil starter is activated and a holding member is released by a shift rod.
Figure 11:
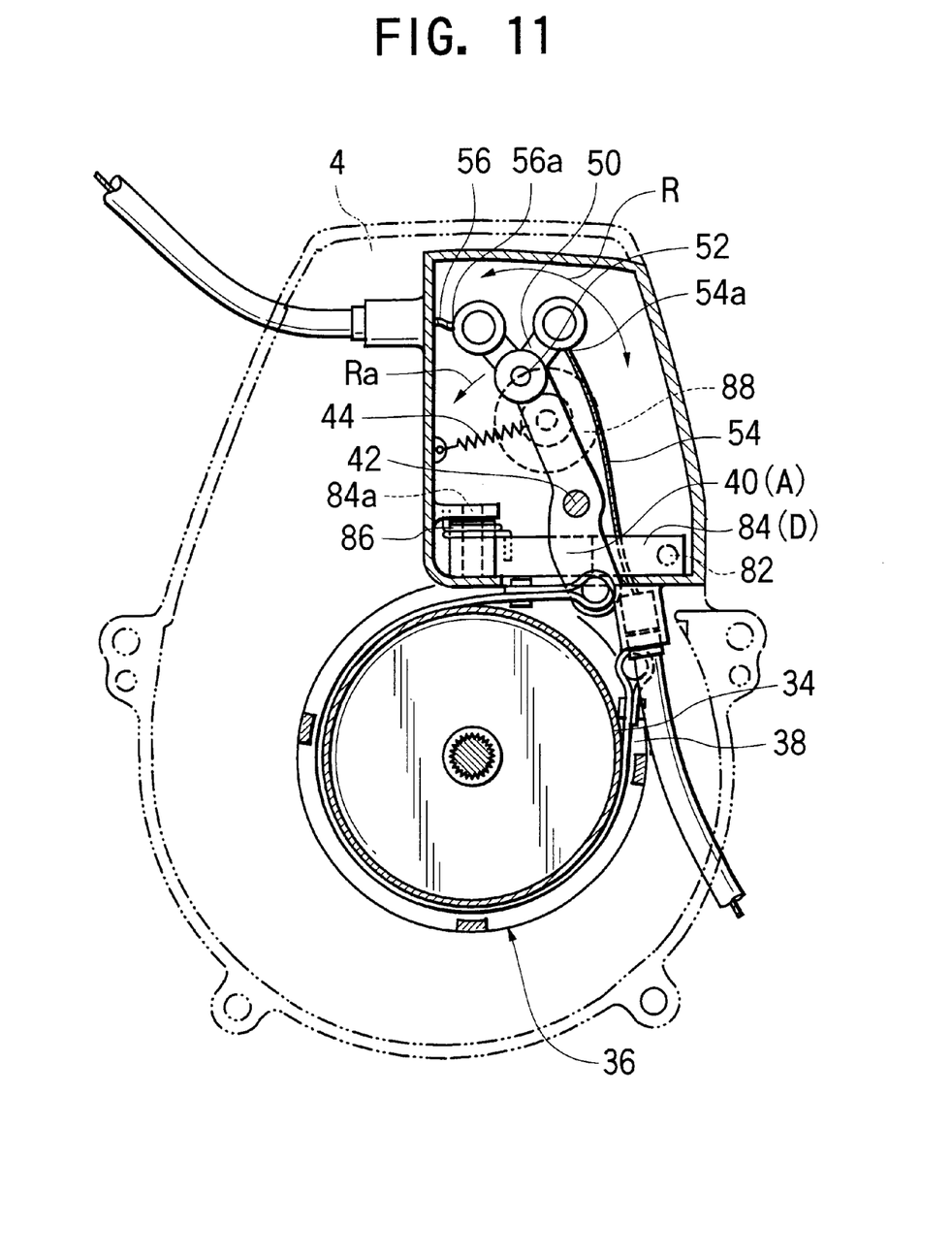
FIG. 11 is a similar view as FIG. 10.

Referring to FIGS. 6, 7, 10, and 11, how the braking device 36 and the throttle wires 54, 56 are operated shall be described. At first, the braking device 36 is at the releasing position "B" shown in FIGS. 8, 9. When the operator holds the handle 64 of the recoil starter 60 and quickly pulls the recoil rope 66, the rotary transmission member 74 and the pushing member 78 attached thereto are moved forwardly in the axial direction and the shift rod 82 is also moved in the same direction. With the movement of the shift rod 82, the holding member 84 is pivotably moved from the holding position (C) shown in a solid line to the retracted position (D) shown in an phantom line as shown in FIG. 7 and is disengaged from the first swinging rod member 40. Then, the first swinging rod member 40 located at the releasing position "B" as shown in FIGS. 8 and 9 is moved to the braking position "A" as shown in FIGS. 10 and 11 by the biasing force exerted by the first tension spring 44 and the brake band 38 is tightened around the clutch drum 34. The second pivoting pin 52 of the second V-shaped swinging member 50 is moved away from the bent path "R" along which the throttle wires 54, 56 extend in the direction specified by an arrow "Ra". The first throttle wire 54 and the second throttle wire 56 are loosened so as to have play as described in the first embodiment with the reference to FIG. 2. This prevents operational transmission from the throttle lever 22 to the throttle valve 46a.

Then, the operator hangs the strap (not illustrated) over the shoulder and holds the portable grass trimmer 2'. At this moment, even if the throttle lever 22 is held by the operator, the throttle valve 46a will not open due to the play provided in the first throttle wire 54 and the second throttle wire 56. Accordingly, the clutch drum 34 is not rotated while prevented by the brake band 38.

In the condition described above, after starting the internal combustion engine 6, the operator laterally pushes the reset device 88 by hand. It causes the first swinging rod member 40 to move from the braking position "A" to the releasing position "B" and the holding member 84 is rotated from the retracted position (D) to the holding position (C) by the biasing force of the second spring 86 and engages with the first swinging rod member 40 to hold the first swinging rod member 40 at the releasing position "B" as shown in FIGS. 8 and 9. Then, the second pivoting pin 52 of the second V-shaped swinging member 50 is again moved toward the path "R" along which the throttle wires 54, 56 extend in the direction specified by an arrow "Rb". The first throttle wire 54 and the second throttle wire 56 are pulled and no longer have play. That is, the operational transmission path from the throttle lever 22 to the throttle valve 46a is established. At this moment, the brake band 38 is loosened and the clutch drum 34 is allowed to rotate freely.

Figure 12:
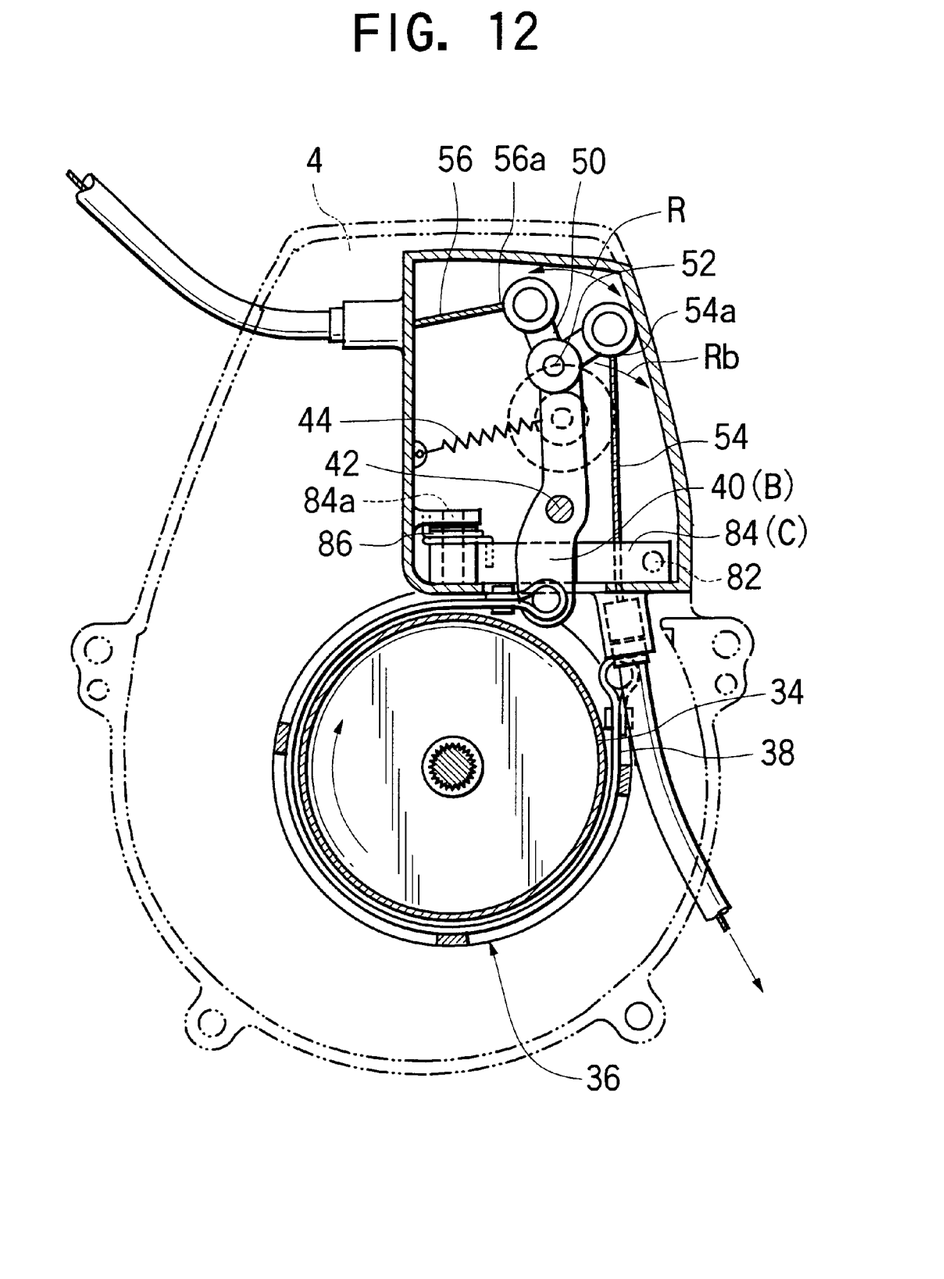
FIG. 12 is a similar view as FIG. 10 and shows where an operator holds a brake release lever to move the first swinging rod member from the braking position to the releasing position to release the brake band and further holds a throttle lever to open a throttle valve.

When the throttle lever 22 is pulled by the operator, the first throttle wire 54 is pulled by the stroke of the throttle lever 22, and only the second V-shaped swinging member 50 swings about the second pivoting shaft 52 while the first swinging rod member 40 is not moved as shown in FIG. 12 and the second throttle wire 56 is pulled to open the throttle valve 46a. In this manner, the clutch drum 34 is rotated by the power from the internal combustion engine 6, whereby the cutter 18 is rotated.

In the first and second embodiments of the present invention, the second pivoting pin 52 of the second V-shaped swinging member 50 to which the throttle wires 54, 56 are connected moves away from (in the direction specified by an arrow "Ra" ) or moves toward the path "R" along which the throttle wires 54, 56 extend when the first swinging rod member 40 moves between the braking position "A" and the releasing position "B". Therefore, it is possible to link the activation of the braking device with the timing of the unestablishment and the establishment of the operational transmission path from the throttle lever 22 to the throttle valve 46a. Further, the operation of the braking device 36 makes it possible to avoid the case where the torque of the clutch drum 34 exceeds the braking force of the braking device 36 so that the cutter 18 is unexpectedly rotated. Further, the rotation of the clutch drum 34 causes no damage to the braking device 36 and the life of the brake band 38 can be extended. On the other hand, when the braking device 36 is at the releasing position "B", the second pivoting pin 52 is moved toward the bent path "R" along which the throttle wires 54, 56 extend in the direction shown by the arrow "Rb" so that there is no play in the throttle wires 54, 56. This enables the throttle valve 46a to open in response to the operation of the throttle lever 22 and the clutch drum 34 is rotated.

In the first embodiment, even if the operator holds the throttle lever 22, the stroke of the throttle lever 22 is not effectively transmitted to the throttle valve 46a due to the play provided in the wire system of the throttle wires 54, 56 unless the brake release lever 24 is held to release the braking device 36. Therefore, this mechanism makes it possible to avoid the case where the torque of the clutch drum 34 exceeds the braking force of the braking device 36 and is unintentionally rotated to cause damage to the braking device 36 even when the operator mishandled the portable grass trimmer 2. Further, since the operator holds the right and left grip portions 19, 20 during trimming work, the operator can keep the braking device 36 released while taking a natural position by holding the brake release lever 24 together with the left grip portion 20. When the operator releases the brake release lever 24, the brake band 38 is tightened against the clutch drum 34 to prevent rotation. At the same time, the throttle wires 54, 56 are loosened and the throttle valve 46a is automatically closed. Since power is not transmitted, the rotation of the cutter 18 can be stopped with a small braking force in a short period of time.

In the second embodiment, it is possible to automatically interlock the start of the internal combustion engine 6 by the recoil starter 60 with the activation of the braking device 36, utilizing the axial movement of the rotary transmission member 74 of the recoil starter 60.

Further, since the braking device 36 is released when the operator activated the reset device 88, the operator can confirm that the trimmer 2' is operating safely before releasing the braking device 36. The present invention has thus been shown and described with reference to specific embodiments. However, it should be noted that the present invention is in no way limited to the details of the described arrangements but changes and modifications may be made without departing from the scope of the appended claims.

For example, in the first and second embodiments, as far as the second V-shaped swinging member 50 is pivotably provided with respect to the first swinging rod member 40, it does not have to be shaped in a V shape. For example, it may be an I-shaped member or the like which is connected to the second pivoting pin 52 at the lower end thereof. The shape of the second Vshaped swinging member 50 may appropriately be determined based on both the directions in which the first throttle wire 54 and the second throttle wire 56 extend, and the strokes of the first throttle wire 54 and the second throttle wire 56 necessary for operating the throttle lever 22 to open the throttle valve 46a.

Further, the first swinging rod member 40 need not always be a rod but, for example, may be a plate so long as it can swing about the first pivoting pin 42 and allow the second V-shaped swinging member 50 to rotate.

Further, in the first and the second embodiments, when the first swinging rod member 40 swings, it moves the second pivoting pin 52 of the second V-shaped swinging member 50 toward the path "R" along which the throttle wires 54, 56 extend in the direction indicated by an arrow "Rb" or away therefrom in the direction indicated by an arrow "Ra". However, a member to which the second V-shaped swinging member 50 is pivotably attached may be provided so as to be laterally and linearly moved to move the second pivoting pin 52. In this case, the brake band 38 can be tightened or loosened around the circumference of the clutch drum 34 by the movement of that member.

Finally, in the braking device 36 of the first and second embodiments, though the brake band 38 is tightened against the clutch drum 34, other appropriate friction members may be pressed against the clutch drum 34 by the movement of the first swinging rod member 40.

What is claimed is:

1. A trimming machine comprising:
   a cutting blade;
   an internal combustion engine having an output for driving said cutting blade;
   a centrifugal clutch for transmitting power from said internal combustion engine to said cutting blade;
   a throttle valve;
   a throttle wire operatively connected to said throttle valve;
   a manually operated throttle lever for controlling the output from said internal combustion engine by adjusting an opening of said throttle valve via said throttle wire;
   a clutch drum provided in said centrifugal clutch;
   a friction member arranged to oppose to said clutch drum;
   a first swinging member connected to said friction member and being allowed to swing between a braking position where said friction member is pressed against said clutch drum and a releasing position where said friction member is spaced from said clutch drum;
   a second swinging member connected to a connecting point at an intermediate portion of said throttle wire and being allowed to pivot about a pivoting pin with respect to said first swinging member when said throttle wire is moved by operating said throttle lever; and
   said throttle wire extending along a bent path which is bent at said connecting point so that said pivoting pin of said second swinging member is moved toward said bent path by a swinging movement of said first swinging member so that said throttle wire has no play when said first swinging member is at said releasing position and said pivoting pin of said second swinging member is moved away from said bent path by a swinging movement of said irst swinging member so that said throttle wire has play when said first swinging member is at said braking position.

2. A trimming machine in accordance with claim 1, further comprising biasing means for biasing said first swinging member toward said braking position, and brake releasing means for moving said first swinging member from said braking position to said releasing position against the biasing force exerted by said biasing means.

3. A trimming machine in accordance with claim 1, further comprising:
   biasing means for biasing said first swinging member toward said braking position, a holding member which is moved between a holding position where said holding member engages with said first swinging member to hold said first swinging member at said releasing position against the biasing force exerted by said biasing means and a retracted position being away from said first swinging member, and
   a recoil starter for starting said internal combustion engine, said recoil starter having a recoil rope and a recoil drum rotated by said recoil rope, a rotary transmission member for transmitting the torque from said recoil drum to a crankshaft of said internal combustion engine by moving in an axial direction of said crankshaft interlocked with the rotation of said recoil drum, and a interlocking member for moving said holding member from said holding position to said retracted position by the movement of said rotary transmission member.

4. A trimming machine comprising:
   a cutting blade;
   an internal combustion engine having an output for driving said cutting blade;
   a centrifugal clutch for transmitting power from said internal combustion engine to said cutting blade;
   a throttle valve;
   a throttle wire operatively connected to said throttle valve;
   a manually operated throttle lever for controlling the output from said internal combustion engine by adjusting an opening of said throttle valve via said throttle wire;
   a clutch drum provided in said centrifugal clutch;
   a friction member arranged to oppose said clutch drum;
   a first swinging member connected to said friction member and being allowed to swing between a braking position where said friction member is pressed against said clutch drum and a releasing position where said friction member is spaced from said clutch drum;
   a second swinging member connected to said throttle wire and being allowed to pivot about a pivoting pin with respect to said first swinging member when said throttle wire is moved by operating said throttle lever; and
   said throttle wire having no play when said first swinging member is at said releasing position and said throttle wire having play when said first swinging member is at said braking position.

5. A trimming machine in accordance with claim 4, further comprising biasing means for biasing said first swinging member toward said braking position, and brake releasing means for moving said first swinging member form said braking position to said releasing position against the biasing force exerted by said biasing means.

6. A trimming machine in accordance with claim 4, further comprising;

biasing means for biasing said first swinging member toward said braking position, a holding member which is moved between a holding position where said holding member engages with said first swinging member to hold said first swinging member at said releasing position against the biasing force exerted by said biasing means and a retracted position being away from said first swinging member, and a recoil starter for starting said internal combustion engine, said recoil starter having a recoil rope and a recoil drum rotated by said recoil rope, a rotary transmission member for transmitting the torque from said recoil drum to a crankshaft of said internal combustion engine by moving in an axial direction of said crankshaft interlocked with the rotation of said recoil drum, and an interlocking member for moving said holding member from said holding position to said retracted position by the movement of said rotary transmission member.

* * * * *